(12) United States Patent
Voth et al.

(10) Patent No.: US 9,393,730 B2
(45) Date of Patent: Jul. 19, 2016

(54) BLOW MOULDING MACHINE WITH DAMPING FOR THE CONTROL THEREOF

(71) Applicant: KRONES AG, Neutraubling (DE)

(72) Inventors: Klaus Voth, Obertraubling (DE); Dieter Finger, Neutraubling (DE); Florian Geltinger, Donaustauf (DE); Paul Brinster, Regensburg (DE)

(73) Assignee: KRONES AG (DE)

( * ) Notice: Subject to any disclaimer, the term of this patent is extended or adjusted under 35 U.S.C. 154(b) by 168 days.

(21) Appl. No.: 14/037,102

(22) Filed: Sep. 25, 2013

(65) Prior Publication Data

US 2014/0097561 A1   Apr. 10, 2014

(30) Foreign Application Priority Data

Sep. 25, 2012  (DE) .......................... 10 2012 109 024

(51) Int. Cl.
  *B29C 49/42*  (2006.01)
  *B29C 49/12*  (2006.01)
  *B29C 49/36*  (2006.01)

(52) U.S. Cl.
  CPC ............. *B29C 49/4236* (2013.01); *B29C 49/12* (2013.01); *B29C 49/36* (2013.01); *B29C 2049/129* (2013.01)

(58) Field of Classification Search
  None
  See application file for complete search history.

(56) References Cited

U.S. PATENT DOCUMENTS

| | | | | |
|---|---|---|---|---|
| 2,951,674 A | * | 9/1960 | Rice | F16F 1/3732 267/141.4 |
| 6,100,310 A | * | 8/2000 | Ho | C08G 18/12 521/159 |
| 7,927,093 B2 | | 4/2011 | Leblond et al. | 425/529 |
| 9,114,559 B2 | | 8/2015 | Finger et al. | B29C 49/12 |
| 2008/0044508 A1 | | 2/2008 | Balboni et al. | 425/155 |
| 2010/0316757 A1 | | 12/2010 | Rymann | 425/529 |
| 2011/0081441 A1 | | 4/2011 | Lin et al. | 425/541 |

(Continued)

FOREIGN PATENT DOCUMENTS

| | | | | |
|---|---|---|---|---|
| CN | 101056749 | 10/2007 | ............. | B29C 43/08 |
| CN | 101203371 | 6/2008 | ............. | B29C 49/42 |
| CN | 102233666 | 11/2011 | ............. | B29C 49/12 |

(Continued)

OTHER PUBLICATIONS

German Search Report (no translation) issued in corresponding application No. 10 2012 109 024.6, dated Apr. 5, 2013 (5 pgs).

(Continued)

*Primary Examiner* — Monica Huson
(74) *Attorney, Agent, or Firm* — Hayes Soloway P.C.

(57) ABSTRACT

An apparatus for shaping plastics material preforms into plastics material containers includes a plurality of shaping stations each having two blow mould parts which are movable with respect to each other and which can be moved between a closed and an opened state. In the closed state the shaping station form a cavity, inside which the plastics material preforms are shaped. The shaping stations have a stressing device which acts upon the preforms with a gaseous medium to expand them, and stretch bars which are capable of being inserted into the preforms to stretch them in the longitudinal direction. The shaping stations each have at least one drive device which drives a movement necessary for the shaping procedure, as well as a control device for controlling this drive device. The control device is arranged on the apparatus through a damping device.

24 Claims, 3 Drawing Sheets

(56) References Cited

U.S. PATENT DOCUMENTS

2011/0260373 A1* 10/2011 Finger ............... B29C 49/12 264/532
2011/0262574 A1 10/2011 Hoellriegl et al. ............ 425/144

FOREIGN PATENT DOCUMENTS

| CN | 102601979 | 7/2012 | ............. B29C 49/10 |
|---|---|---|---|
| DE | 19528751 | 10/1996 | ............. B29C 49/04 |
| DE | 102010011244 | 9/2011 | ............. B29C 49/42 |
| DE | 102010028253 | 10/2011 | ............. B29C 49/12 |
| EP | 2383102 | 11/2011 | ............. B29C 49/12 |

OTHER PUBLICATIONS

European Search Report (no translation) issued in related application No. 13185232.9, dated Jan. 17, 2014 (5 pgs).
Chinese Office Action (w/translation) issued in application No. 201310442804.2, dated Dec. 3, 2015 (16 pgs).

* cited by examiner

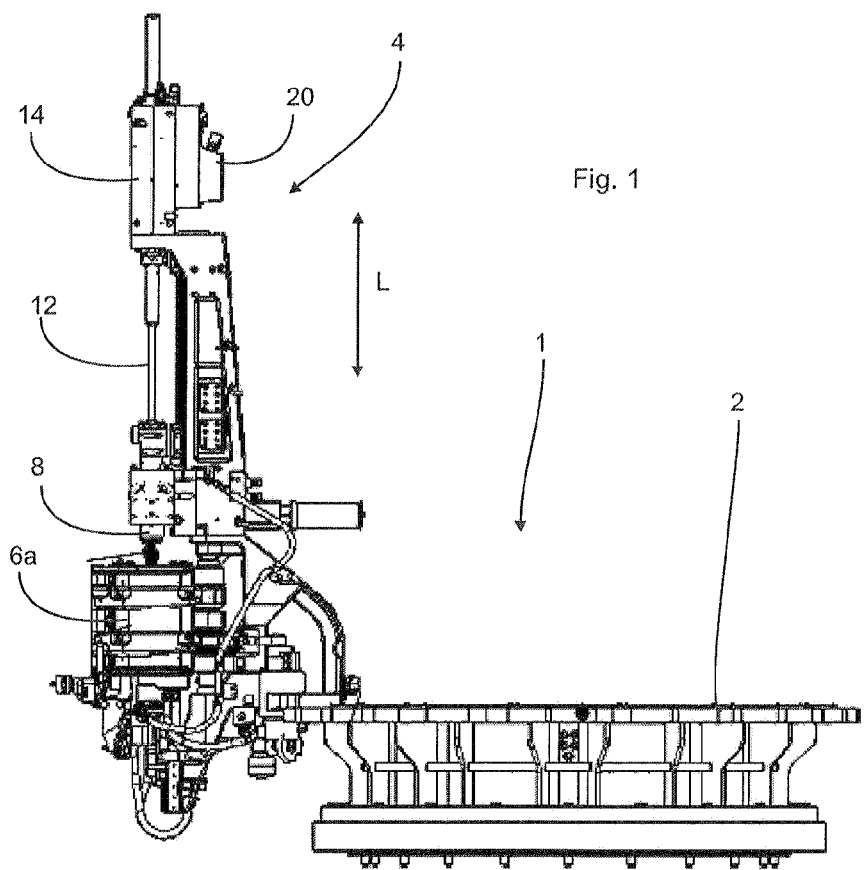
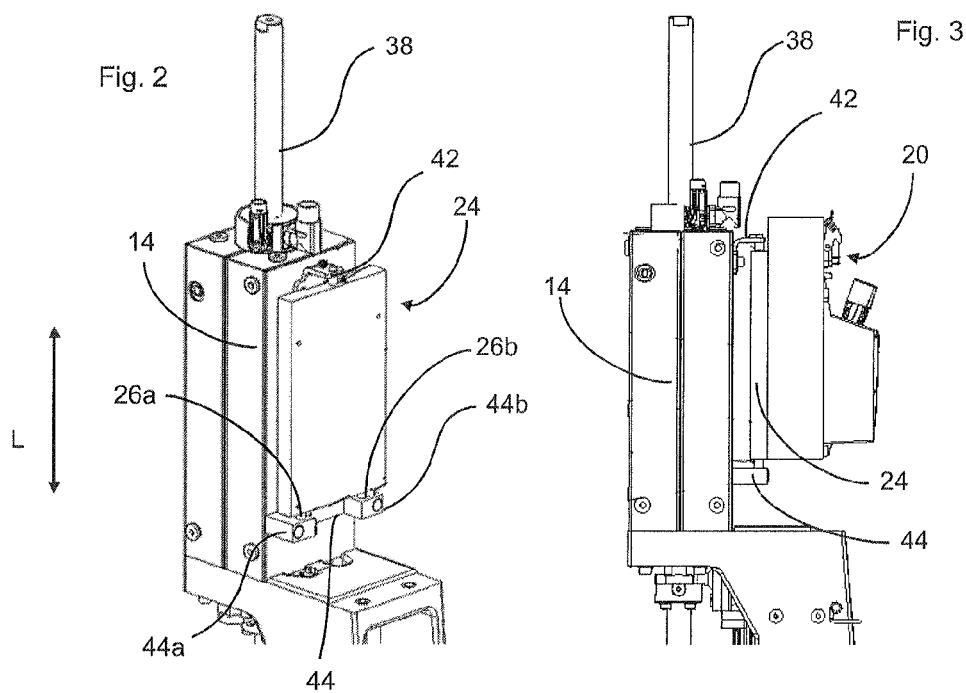

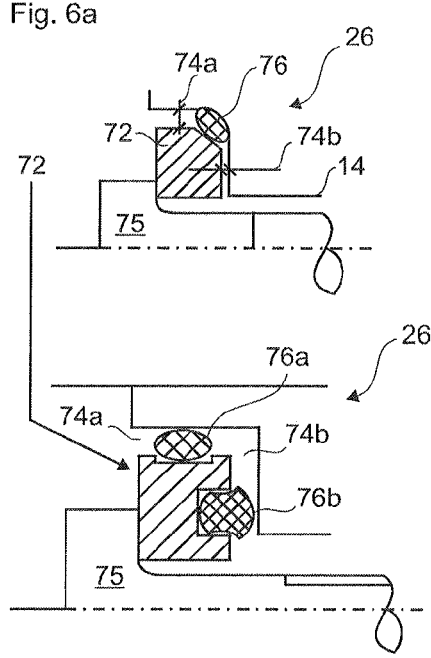
Fig. 6a
Fig. 6b
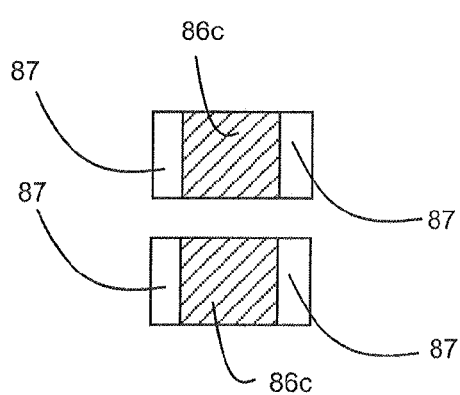
Fig. 7d
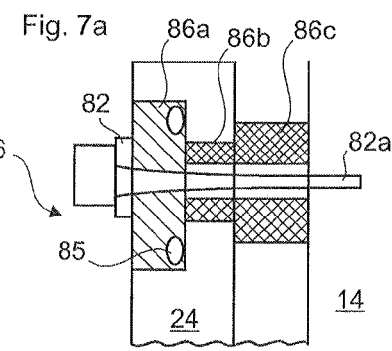
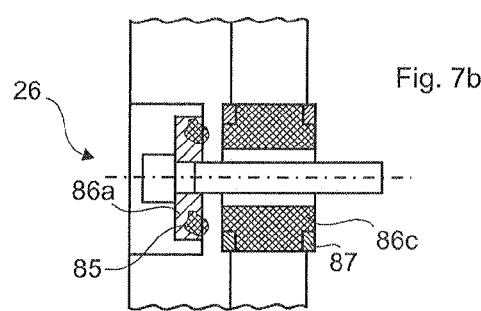
Fig. 7b
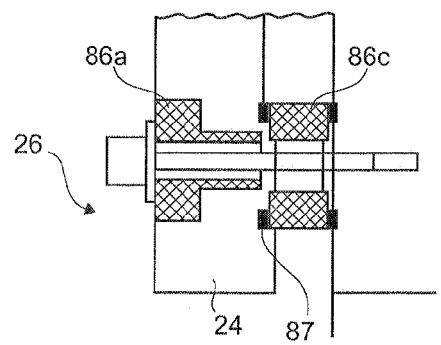
Fig. 7c

BLOW MOULDING MACHINE WITH DAMPING FOR THE CONTROL THEREOF

BACKGROUND OF THE INVENTION

The present invention relates to an apparatus for the shaping of plastics material preforms into plastics material containers. It is known in the beverage producing industry to produce plastic bottles from plastics material preforms, which are first heated and are then expanded by means of blow moulding nozzles. A shaping device of this type, also referred to below as a stretch blow moulding machine, usually has a conveying device, such as for example a blow moulding wheel, on which a plurality of shaping stations or blow moulding stations respectively are arranged. These blow moulding stations of a stretch blow moulding machine of this type are in this case the core in which the plastics material pre-forms are blow moulded by the application of an internal pressure to the plastic bottles. The pre-heated plastics material preform, also referred to below as a perform, is positioned in this case in the mould between the mould carriers. The actual blow moulding process follows after the stretching by a stretch bar, which is usually driven by a drive device, such as for example a linear motor. The internal pressure which is applied presses the plastics material pre-form against the mould from the inside, as a result of which the container accepts its desired shape.

In this case, within the scope of a blow moulding process of this type, widely differing movements occur, such as for example the movement of the blow mould parts for opening and closing the blow mould, the movements of the stretch bar, the movements of a blow moulding nozzle and the like. The blow moulding procedure and the kinematic movement during the opening and closure of the mould carriers result in this way in relatively high process forces which also cause the complete shaping station to oscillate. Since electronic components, such as for example servo-inverters, are also usually arranged rigidly on the blow moulding station, the process forces described are passed on directly to them. Some of the electronic devices installed and used in the blow moulding stations cannot then withstand these acceleration forces or the oscillations respectively which occur and they frequently break down.

The object of the present invention is therefore to improve the service live of these electronic appliances or control devices respectively and, in particular, to reduce the forces or accelerations respectively which act upon these control devices or electronic components respectively.

SUMMARY OF THE INVENTION

An apparatus according to the invention for the shaping of plastics material preforms into plastics material containers has a conveying device on which are arranged a plurality of shaping stations for the shaping of the plastics material preforms. In this case these shaping stations have in each case at least two blow mould parts which are movable with respect to each other and which can be moved between an opened state and a closed state of the shaping station and in the closed state of the shaping station form a cavity, inside which the plastics material preforms are capable of being shaped into the plastics material containers. In addition, the shaping stations have in each case a stressing device which act upon the plastics material preforms with a gaseous medium, and in particular with compressed air, in order to expand them.

In addition, the shaping stations have in each case stretch bars which are capable of being inserted into the plastics material preforms in order to stretch them in the longitudinal direction thereof.

In addition, the shaping stations have in each case at least one drive device which drives a movement necessary for the shaping procedure. Furthermore a control device for controlling this drive device is also provided.

It is advantageous in this case for this control device to be arranged on the apparatus, and in particular on at least one shaping station, by means of a damping device.

In this case it is possible for a control device of this type to be associated with each shaping station, but it would also be possible for a control device to be used to actuate a plurality of shaping stations. It would also be possible for a plurality of control devices to be arranged on a shaping station, in particular by means of damping devices.

As mentioned above, in view of the relatively high physical stressing by process forces upon the sensitive electronic components, a high breakdown rate always has to be expected. The invention therefore proposes that the connection—which is usually rigid in the prior art—to the apparatus or the shaping station respectively should be released. It is replaced instead by a floating or respectively damped connection. The movement required or respectively used for the shaping procedure can be for example a movement of the stretch bar, a movement of a blow moulding nozzle or even a pivoting movement of the two blow mould parts or respectively lateral parts or, on the other hand, a movement of a base mould for the blow mould.

It is advantageous for the conveying device to be a rotatable conveying device, and in particular a blow moulding wheel, the plurality of shaping stations or blow moulding stations respectively being arranged on an external periphery of this blow moulding wheel.

It is preferable for at least one drive device to be an electric-motor drive device. In addition, however, this drive device could also be a magnetic, hydraulic or pneumatic drive device. The control device preferably has in this case a plurality of electronic components and, in particular, semiconductor components.

In the case of a further advantageous design a drive device for moving the stretch bar is provided as well as a control device for controlling this drive device, and this control device for controlling the drive device is preferably arranged on the shaping station by means of the damping device.

It is advantageous in this case for the control device to be arranged on a carrier of the aforesaid shaping station.

In the case of a further advantageous design the control device has at least one inverter unit or one inverter respectively. It is preferable for this to be, in particular, a servo-inverter which is used for actuating the drive device or drive devices. This drive device or these drive devices is or are advantageously designed in the form of a servo linear motor or servo linear motors respectively.

In the case of a further advantageous design the control device is arranged on a carrier and this carrier in turn is arranged on the shaping station by means of the at least one damping device.

In the case of a further advantageous design the damping device has a plurality of damping elements, by means of which the control device is arranged on the shaping station. It is advantageous in this case for the individual damping elements to be arranged at a distance from one another. In this way, it is advantageous for the control device or the carrier respectively on which the control device is arranged to be mounted on the shaping station with a multiple-point bearing.

It is advantageous for at least two damping elements and preferably three damping elements to be provided, in order to support the control device. In this case it is possible for these three damping elements to span an isosceles triangle, by means of which damping elements the control device or the carrier thereof respectively is mounted. In this way, a particularly efficient damping can be achieved.

It is advantageous for at least one damping device to have a symmetrical shape and, in particular, a circular cross-section. In this way, a uniform damping can be achieved in a pre-set plane irrespectively of a stressing direction.

In the case of a further advantageous design the damping device has at least one damping element produced from an elastomer. In general, at least one damping element is produced at least locally from a plastics material or elastomer respectively. In this case this damping element can be arranged between two harder components, in particular two metallic parts.

In this way, there is no metallic connection between the control device or the carrier and the shaping station thereof respectively.

In the case of a further advantageous design one end of an element for the de-coupling of the oscillations is connected in a fixed manner to the shaping station and the other end is connected in a fixed manner to the carriers or the components of the control device respectively, in which case an elastomer is present between these two ends.

In this way, it would be possible for example for the aforesaid connecting elements or damping elements respectively and thus also the damping device to be directly connected for example to an element of the stretch bar drive and, in particular, to a stator of this stretch bar drive.

In the case of a further advantageous design the damping device has a damping element which has a density of less than 2.1 g/cm$^3$. Materials of this type are particularly suitable for use in the present machines.

In the case of a further advantageous design a cooling device is provided for cooling the control device and/or the drive controlled by the aforesaid control device. In this case it is possible for the above-mentioned drive and, in particular, the stator thereof, i.e. the stator of the stretch bar and also the carrier plate or the control device respectively and other electronic components to be supplied jointly with a cooling medium. In this case it is possible for these components to be cooled by a liquid, but a gas cooling or an air cooling respectively would also be possible. In this way for example, the above-mentioned carrier, on which the control device is arranged, could have cooling ducts. It is preferable for a connecting line to be arranged between the cooling device, which cools the drive itself, and the aforesaid carrier. It is advantageous in this case for a cooling medium first to cool the drive and then (or respectively downstream) the control device thereof.

In the case of a further advantageous design the damping device is provided inside a reference circle of the conveying device. In this way, it is made possible for the jointly rotating mass to be situated further in the direction of the centre of the conveying device or the blow moulding wheel respectively.

In the case of a further advantageous design the arrangement for decoupling the oscillations is arranged inside the reference circle of the blow moulding wheel and/or behind a stretch bar axis in a vertical or respectively radial direction.

It would also be possible, however, for the control device optionally to be situated together with the damping device behind a mould carrier of the blow moulding station or even behind a blow moulding nozzle. This means that the height at which the control device is arranged can be varied, in particular in a manner dependent upon the drive controlled.

In the case of a further advantageous design a control device is provided which is associated with a plurality of blow moulding stations or which actuates a plurality of blow moulding stations respectively. This is, in particular, one of the above-mentioned control devices decoupled from the oscillations.

It would also be possible in this case for a control device of this type, which in particular is decoupled from the oscillations, to be situated between the blow moulding stations.

In addition or as an alternative, it would also be possible for the control device (optionally jointly with a carrier) to be arranged not on the shaping stations but on the blow moulding wheel. If the control device is arranged on the blow moulding wheel, it is even optionally possible to dispense with the damping devices described above, since on account of its high mass the blow moulding wheel is already subjected to substantially fewer oscillations than the individual shaping stations. In this case, therefore, it would be possible—in contrast to apparatus from the prior art—for the control devices for controlling the individual drives of the shaping stations to be arranged not on the shaping stations themselves but on the conveying device or the blow moulding wheel respectively. It would be advantageously possible in this case for the control device to be arranged relatively far inside on the blow moulding wheel in order to reduce the respective centrifugal forces in this way.

The present invention further relates to a method of shaping plastics material preforms into plastics material containers, in which plastics material preforms are shaped into the plastics material containers by means of at least one shaping station arranged on a conveying device and are acted upon with a flowable medium by means of at least one stressing device for the purpose of this shaping.

In this case the shaping station for shaping the plastics material preforms performs at least one and preferably a plurality of movements with at least one drive device and preferably with a plurality of drive devices and this drive device is controlled by a control device.

According to the invention the control device is arranged on the apparatus by means of a damping device in such a way that oscillations caused by the movements are transmitted not undamped or respectively at least damped in part to the control device.

It is thus also proposed with respect to the method that the oscillations occurring within the framework of the shaping procedure, in particular of the shaping station, should be transmitted only damped to the control device, so that the sensitive electronic elements are protected. It is advantageous for the plastics material preforms to be stretched in the longitudinal direction thereof by means of a stretch bar for the purpose of shaping them. It is also advantageous for a movement or respectively oscillation caused by the movement of this stretch bar to be transmitted only damped to the control device. It is advantageous for an apparatus of the type described above to be used for the method according to the invention.

BRIEF DESCRIPTION OF THE DRAWINGS

Further advantages and designs are evident from the accompanying figures. In the figures FIG. 1 is a view of a shaping device according to the invention;

FIG. 2 is a detailed view of the apparatus shown in FIG. 1;

FIG. 3 is a further detailed view of the apparatus shown in FIG. 1, and

FIG. 6a, b are two further illustrations to explain the damping, and

FIG. 7a-d are three further illustrations to explain the damping.

DETAILED DESCRIPTION OF THE INVENTION

Figure 4:
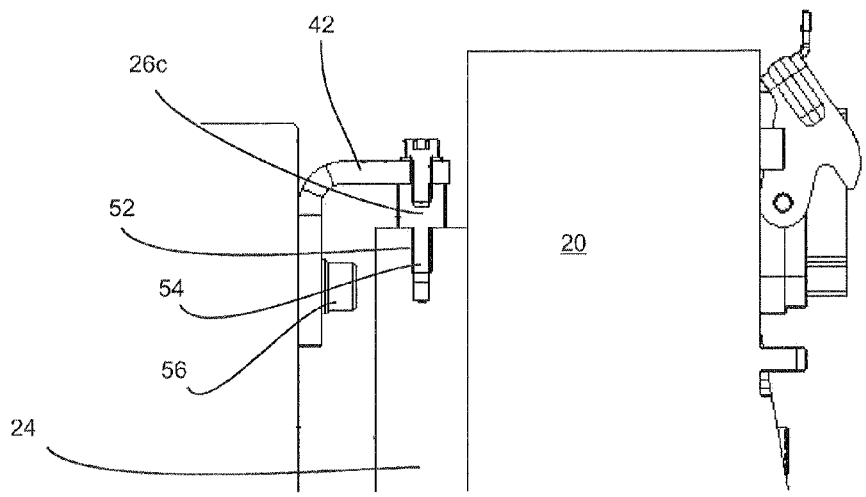
FIG. 4 is a further detailed view of the apparatus shown in FIG. 1.

FIG. 1 is a partial illustration of an apparatus 1 according to the invention for the shaping of plastics material preforms into plastics material containers. It has in each case a conveying device 2 on which a plurality of shaping stations 4 (only one shown) are arranged. In this case these shaping stations (also referred to below as blow moulding stations) 4 have in each case stressing devices in the form of one blow moulding nozzle 8 in each case, which is movable in a longitudinal direction L and is mounted on apertures of the plastics material preforms 10 arranged in the interior of two blow mould carriers 6a, 6b (only the blow mould carrier 6a is visible) in order to act upon them with compressed air for the expansion thereof. In addition, a drive device is provided which moves this stressing device 8 in the longitudinal direction L. In addition, the apparatus has a valve block which has a plurality of valves by which the supply of blowing air to the plastics material preforms can be controlled.

The reference number 12 designates a stretch bar which within the scope of the shaping process is capable of being inserted into the plastics material pre-forms 10 in order to stretch them in the longitudinal direction L. In this way, this stretch bar 12 is also moved in the longitudinal direction L. The reference number 14 designates a drive which performs this movement of the stretch bar 12. This is, in particular, a linear motor. A control device 20, which in particular also has a servo inverter, is provided in order to control this linear motor 14. The reference number 10 designates the plastics material pre-form which is expanded with the aid of the blowing air. The pre-form is visible only in part in this case, however, since a major part thereof is already present inside the blow moulds. Carrier shells are usually arranged on the blow mould carriers 6a shown, and blow mould parts in turn are arranged on these carrier shells. In this case these blow mould parts jointly form the cavity inside which the plastics material pre-forms are expanded into the plastics material containers.

During the production of the containers a pre-heated plastics material pre-form is positioned in the mould between the mould carriers. After the stretching by the stretch bar which, as mentioned above, is driven by a linear motor, the actual blow moulding process follows. The internal pressure applied presses the plastics material pre-form against the blow mould from the inside, as a result of which the bottle assumes the desired shape.

In this way, during the shaping process a multiplicity of different movements occur, such as the movement of the blow moulding nozzle, the movement of the stretch bar, the opening and closure of the blow mould carriers and the like. In view of the relatively high physical stressing by these process forces upon the sensitive electronic components, a high failure rate always has to be expected.

FIG. 2 is a detailed illustration of the apparatus according to the invention, in particular with an explanation of the arrangement—according to the invention—of the control device 20. In this case FIG. 2 is a detailed illustration of the region of the drive device 14. It is evident that a carrier 24 or a carrier plate respectively is arranged on this drive device 14.

In this way, FIG. 2 is a detailed illustration of the apparatus shown in FIG. 1 and, in particular, that region of the apparatus in which the drive device for driving the stretch bar 12 is arranged. It is pointed out that corresponding arrangements are also possible in the case of the drive for moving the blow moulding nozzle or even the mould carrier parts. The carrier 24 is arranged on the drive device 14, more precisely on the stator thereof. This carrier 24 is fastened in this case to two holding devices 42 and 44 by way of damping elements 26a, 26b, 26c. These damping elements 26a, 26b, 26c form in this case the damping device 26.

In this way, the carrier 24 is arranged in a "floating" manner on the drive device 14 or on a carrier of the shaping station respectively. The holding device 42 is in this case a fastening angle member which for example can be screwed to the drive device 14. The damping elements 26a, 26b and 26c can be for example designed in the form of rubber buffers. The reference number 44 designates a support strip which in turn has two holding elements 44a and 44b which hold the carrier by way of the damping elements 26a, b, c.

FIG. 3 is a side view of the apparatus shown in FIG. 2. In this case the control device 20, which for example can have a servo inverter, is also arranged on the carrier 24. Here too, the holding elements 42 and 44 are again evident, in which case the holding element 42 is designed in the form of a holding angle member and the holding elements 44 are designed in the form of elements which are arranged on the support strip 44. The reference number 38 designates a secondary part of the drive 14 which moves in a vertically reciprocating manner in the direction L.

FIG. 4 is a detailed illustration of the damping. In this case too, the carrier 24 or the carrier plate respectively with the control device 20 arranged on it in a fixed manner is again evident. The holding element 42 is also illustrated here. This holding element 42 is screwed onto the drive device 14 by means of a screw member 56. In this way, in the case of the design shown in FIG. 4 the decoupling of the oscillations of the control device is carried out. The fastening angle member 42 and the support strip 44 shown in FIG. 3 are in each case screwed to the blow moulding station here. The control device 20 is, as mentioned, rigidly connected to the carrier or the plate respectively. As a result, the carrier 24 and the control device are fastened in a floating manner with respect to the shaping station 4, i.e. when a force is applied the damping means permit a relative movement of the control device 20 with respect to the shaping station, namely in all three axial directions.

In this case it would be possible for the carrier plate to be equipped with a relatively large weight, so that it is no longer set in oscillation to an excessive degree. It is advantageous for the mass of this carrier to be between 0.5 kg and 3 kg, preferably between 0.5 kg and 2 kg, and preferably between 0.5 kg and 1.5 kg. In this case it is also possible for the mass to be selected in a manner dependent upon the oscillations which occur, for example in such a way that no resonance frequencies occur. In addition, it would be possible for the mass of this carrier 24 to be variable (for example by screwing on additional weights).

Depending upon the design, there are various possibilities for installing the damping element (in this case 26c). In the case of the design shown in FIG. 4 the damping element 26c is rigidly screwed at both ends to the fastening angle member 42 and the carrier 24. With their resilient bodies damping elements 26a, b, c form a flexible connection attached between the shaping station and the electronic component 20.

In this case the damping element 26c can have a projection 54 which is inserted and preferably screwed into a corresponding recess 52 in the carrier 24. Other possibilities of fastening, however, are also feasible here.

As mentioned, a hovering or floating suspension in a plane which in this case is at a right angle to the plane of the figures can be achieved, in particular, with the damping element and the two further damping elements (not shown). In addition, however, the damping element also permits a certain oscillation in a direction at a right angle to this, i.e. in particular in this case in a direction which extends at a right angle to the aforesaid plane or in the plane of the figures respectively.

As mentioned above, the carrier 24 can be attached in different ways or respectively to different elements of the blow moulding station. It would also be possible for the carrier to be arranged not on the shaping station but on the blow moulding wheel (cf. FIG. 1). It is preferable, however, as shown in FIG. 4, for the carrier 24 to be arranged stationary, i.e. in a vertical orientation, and not horizontally or in the horizontal direction respectively and for the damping to be orientated accordingly respectively. This is based upon the fact that the oscillations which occur act for the most part in the direction at a right angle to the plane of the figure and so make the greatest demands upon the damping in this direction. In particular, the movement of the stretch bar will produce oscillations in a particular manner, which extend in the longitudinal direction L. In this way, the damping elements shown here are also suitable in particular for compensating or respectively damping oscillations of this nature.

Other designs of the damping, however, would also be possible. In this way, for example, a flexible frame could be provided in which the carrier device is arranged. In addition, spring elements and the like could be provided for damping purposes. The design with the elastomer damping element 26c shown here affords the advantage, however, that it is relatively simple and inexpensive to implement.

Figures 5A, 5B:
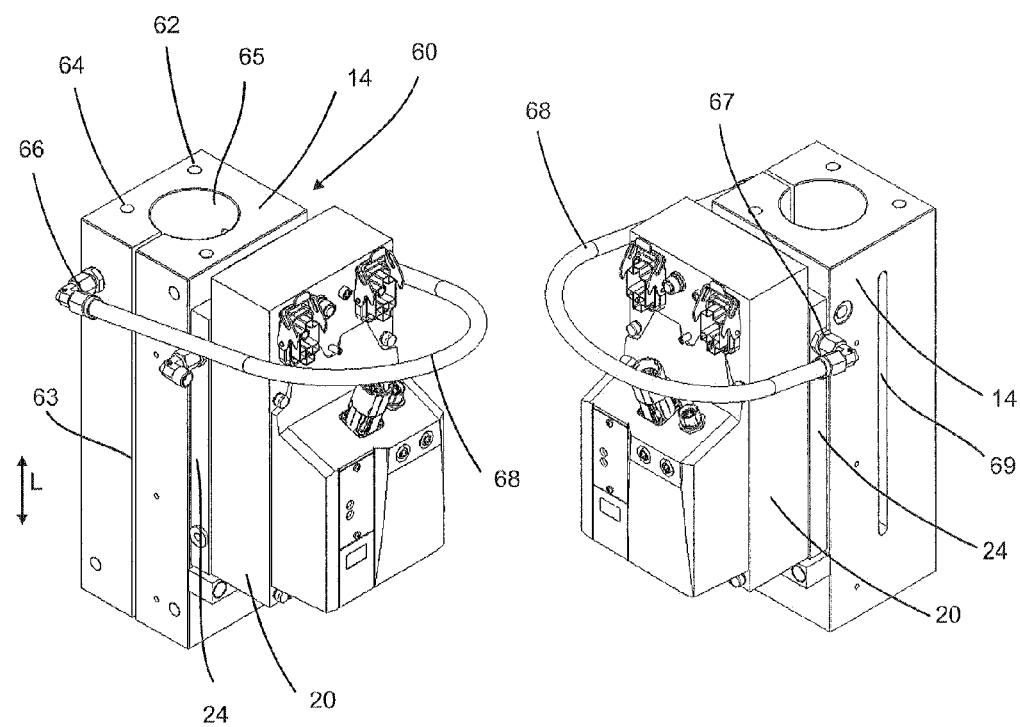
FIG. 5a, b are two illustrations to explain the cooling.

FIGS. 5a and 5b illustrate, in particular, the cooling of the control device 20. In this case a cooling device 60 in the form of a liquid cooling means is provided. For this purpose the drive device 14 has cooling ducts 62, 64 through which a flowable, and in particular liquid, cooling medium can flow. In addition, a transverse duct (not shown), through which the cooling medium can pass from the duct 64 to a connection 66, is provided in the interior of the housing 14. Starting from the duct 66, the cooling medium flows by way of a line 68 to the carrier or the adapter plate 24 respectively. In this case this carrier also has in the interior thereof a duct for cooling. The second connection 67, by which the line 68 is attached to the carrier 24, is also visible in FIG. 5b.

The reference number 65 designates a cavity inside which the secondary part of the drive 14 can move. It is preferable for the line 68 to be a flexible line. The reference number 63 designates a gap which extends in the longitudinal direction L of the drive device 14 or respectively the housing thereof. A further recess 69, which extends in the longitudinal direction L and which, however, in contrast to the gap 63 is not made continuous in the longitudinal direction L, is provided opposite this gap 63 (cf. FIG. 5b). In this cavity 65 preferably a wind is arranged and especially arranged fixedly within this wind the secondary part can move.

FIGS. 6a and 6b show a further arrangement of the damping device 26. In the case of the design shown in FIG. 6a a disc 72 is arranged on the drive device 14 by means of a fastening means 75 such as a screw. This disc 72, which can be produced from metal or a plastics material, can be connected in a fixed manner in this case to the carrier (not shown) on which the control device in turn is arranged. Two gaps 74a, 74b are formed between this disc 72 and the drive device 14 or the housing thereof respectively, and a damping element 76, such as an O-ring in this case, which keeps the drive device 14 and the disc 72 at a distance and thus also damps the oscillations which start from the drive device 14, is provided in a corner region.

The arrangement shown in FIG. 6b is similar to the arrangement shown in FIG. 6a, two gaps 74a and 74b likewise being provided in this case, but two O-rings 76a, 76b which keep the disc 72 on the one hand and the drive device 14 on the other hand at a distance and thus again effect the damping.

FIGS. 7a to 7d illustrate a further design of a damping device 26. In the case of the design shown in FIG. 7a three elastomer elements or respectively damping elements 86a, 86b, 86c are provided, by means of which the carrier 24 is arranged on the drive device 14. In this case the damping element 86c is arranged between the drive device 14 and the carrier 24. A further damping element 86a supports a fastening means 82 with respect to the carrier. This damping element 86a can be designed in this case in the form of an elastomer perforated disc. An O-ring 85 can be provided in this case on the surface of this disc 86a facing the carrier 24. In this case it is also possible for the disc 86a itself to be rigid and for the damping to be carried out by the O-ring 85. The damping element 86b is designed in this case in the form of a cylindrical body which surrounds the shaft of the fastening means 82.

In the case of the design shown in FIG. 7b a disc 86a is screwed to the drive device 14 by means of the O-ring 85 and the fastening means 82. The damping element 86c is again produced in this case from an elastomer and, in addition, also has a ring-like body 87 (which in particular is produced from a metal or a relatively hard plastics material). The damping is carried out in particular in this case by the damping element 86c as well as the O-ring 85. This ring-like body 87 or the metallic disc 87 respectively serves in this case as a centring means of the damping element 86c and for example can be vulcanized into the damping element 86c. In this case it is possible for this disc to be larger than the corresponding bore in the carrier 24.

FIG. 7c shows a further design in which the damping elements 86a and 86c shown in FIG. 7a are formed in one piece, as a result of which the production is simplified.

FIG. 7d is a further illustration to explain the damping element 86c which in this case is embedded in two metallic discs 87.

The Applicants reserve the right to claim all the features disclosed in the application documents as being essential to the invention, insofar as they are novel either individually or in combination as compared with the prior art.

LIST OF REFERENCES 1 apparatus
2 conveying device
4 shaping station, blow moulding station
6a, 6b blow mould carrier
8 stressing device
10 plastics material preform
12 stretch bar
14 drive
20 control device
24 carrier
26 damping device
26a, 26b, 26c damping elements
42, 44 holding device 44a, 44b holding elements
52 recess
54 projection
56 screw member
60 cooling device
62, 64 cooling ducts
63 gap
65 cavity
66 connection
67 connection
68 line
69 recess
72 disc
74a, 74b gap
75 fastening means
76 damping element, O-ring
76a, 76b damping elements, O-rings
82 fastening means
85 O-ring
86a-c damping element
87 ring-like body, disc
L longitudinal direction, direction of movement

The invention claimed is:

1. An apparatus for the shaping or plastics material preforms into plastics material containers with a conveying device on which are arranged a plurality of shaping stations for the shaping of the plastics material preforms, wherein these shaping stations have in each case two blow mould parts which are movable with respect to each other and which can be moved between a closed state and an opened state of the shaping station and in the closed state of the shaping station form a cavity, inside which the plastics material preforms are capable of being shaped into the plastics material containers, and wherein the shaping stations have in each case a stressing device which act upon the plastics material preforms with a gaseous medium in order to expand them, and wherein the shaping stations have in each case stretch bars which are capable of being inserted into the plastics material preforms in order to stretch them in the longitudinal direction (L) thereof, wherein the shaping stations have in each case at least one drive device which drives a movement necessary for the shaping procedure, as well as a control device for controlling this drive device, wherein the control device is arranged on the apparatus through a damping device, which damping device has a plurality of damping elements which establish a damped connection between the control device and the apparatus, and which damp oscillation in at least a first direction and a second direction at a right angle to the first direction.

2. The apparatus according to claim 1, wherein at least one drive device is an electric-motor drive device.

3. The apparatus according to claim 1, wherein a drive device for moving the stretch bar is provided and a control device for controlling this drive device is arranged on the shaping station through the damping device.

4. The apparatus according to claim 1, wherein the control device has at least one inverter.

5. The apparatus according to claim 1, wherein the control device is arranged on a carrier and this carrier is arranged on the shaping station through the at least one damping device.

6. The apparatus according to claim 1, wherein the damping device has a plurality of damping elements through which the control device is arranged on the apparatus.

7. The apparatus according to claim 1, wherein the damping device has at least one damping element produced from an elastomer.

8. The apparatus according to claim 1, wherein the damping device has a damping element which has a density of less than 2.1 g/cm³.

9. The apparatus according to claim 1, wherein a cooling device is provided for cooling the control device and/or the drive controlled by the aforesaid control device.

10. The apparatus according to claim 1, wherein the damping device is arranged inside a reference circle of the conveying device.

11. The apparatus according to claim 1, wherein the damping device comprises individual damping elements which are arranged at a distance from one another.

12. The apparatus according to claim 1, wherein control device or a carrier on which the control device is arranged is mounted on the shaping station with a multiple-point bearing.

13. The apparatus according to claim 1, wherein the damping device comprises at least two damping elements spaced as corners of an isosceles triangle.

14. The apparatus according to claim 1, wherein the damping device has a symmetrical shape.

15. The apparatus according to claim 14, wherein the damping device has a circular cross-section.

16. The apparatus according to claim 1, wherein the damping element is arranged between two rigid components.

17. The apparatus according to claim 16, wherein the rigid components comprise metallic parts.

18. The apparatus according to claim 1, wherein there are no metallic connections between the control device or a carrier on which the control device is arranged, and the shaping station thereof respectively.

19. The apparatus according to claim 1, wherein the damping device comprises a disc arranged on the drive device by a fastener.

20. The apparatus according to claim 19, wherein the fastener comprises a screw.

21. The apparatus according to claim 19, wherein the disc is formed of a metal or a plastics material, and is connected in a fixed manner to a carrier on which the control device in turn is arranged.

22. The apparatus according to claim 19, wherein the damping device comprises at a corner region thereof, a damping element which keeps the disc and the drive device at a distance from one another, and which also damps oscillations which originate with the drive device.

23. The apparatus according to claim 1, wherein the damping device comprises a disc which is fixed to the drive device through an O-ring and a fastener.

24. The apparatus according to claim 23, wherein the damping device has a ring-shaped body formed from a metal or a hard plastic material, and damping is carried out by the damping device as well as the O-ring, and wherein the ring-shaped body or the disc serves to center the damping element.

* * * * *